United States Patent
Beck et al.

(10) Patent No.: US 6,171,538 B1
(45) Date of Patent: *Jan. 9, 2001

(54) MOLDING MULTI-LAYERED ARTICLES USING COINJECTION TECHNIQUES

(75) Inventors: Martin H. Beck; George F. Rollend, both of Amherst, NH (US)

(73) Assignee: DTL Technology Limited Partnership, Amherst, NH (US)

( * ) Notice: Under 35 U.S.C. 154(b), the term of this patent shall be extended for 0 days.

This patent is subject to a terminal disclaimer.

(21) Appl. No.: 09/302,219

(22) Filed: Apr. 29, 1999

Related U.S. Application Data

(62) Division of application No. 08/832,893, filed on Apr. 7, 1997, now Pat. No. 5,922,363.

(51) Int. Cl.[7] ................................................. B29C 45/16
(52) U.S. Cl. .................. 264/255; 264/297.1; 264/297.2; 264/328.8; 264/328.14; 425/130
(58) Field of Search .................................. 425/130, 562, 425/564, 572, 588; 264/241, 328.8, 255, 297.1, 297.2, 328.14

(56) References Cited

U.S. PATENT DOCUMENTS

| | | | | |
|---|---|---|---|---|
| 4,657,496 | * | 4/1987 | Ozeki et al. .......................... | 425/130 |
| 4,710,118 | | 12/1987 | Krishnakumar et al. ............ | 425/130 |
| 5,143,733 | * | 9/1992 | Von Buren et al. ................. | 425/130 |
| 5,232,710 | * | 8/1993 | Miyazawa et al. .................. | 425/130 |

* cited by examiner

*Primary Examiner*—Jan H. Silbaugh
*Assistant Examiner*—Suzanne E. McDowell
(74) *Attorney, Agent, or Firm*—Davis and Bujold

(57) ABSTRACT

A multi-cavity coinjection mold and method for simultaneously producing a plurality of multi-layered articles comprising: a mold structure defining a plurality of mold cavities; a first supply source for supplying metered amounts of a first molding material; a second supply source for supplying metered amounts of a second molding material; a hot runner system in communication with the first and second supply sources for conveying the metered amounts of the first and the second materials separately to a region proximate each of the cavities; a valve mechanism per cavity for receiving the metered amounts of the first and second materials from the hot runner system and for sequentially supplying desired quantity of the first and second materials contiguously to each cavity.

2 Claims, 2 Drawing Sheets

MOLDING MULTI-LAYERED ARTICLES USING COINJECTION TECHNIQUES

This is a divisional application of U.S. patent application Ser. No. 08/832,893 filed Apr. 7, 1997 now U.S. Pat. No. 5,922,363.

FIELD OF THE INVENTION

This invention relates generally to coinjection molding and particularly relates to an improved apparatus for simultaneously molding a plurality of multi-layered articles.

DEFINITIONS

As used herein:

"First and second materials" is intended to cover at least two materials which are sequentially supplied to an injection mold, it being entirely possible that one or more other materials may be sequentially supplied before, between, or after the first and second materials;

"Balanced Hot Runner" is a temperature controlled heated uninterrupted material conveying system extending from a single input (e.g. a material source or metering valve) to a plurality of outputs (e.g. metering valves or injection mold cavities) comprising a single passage branched into a plurality of passages with each of said plurality of passages, communicating with one of the plurality of outputs, for conveying material therethrough to simultaneously supply equal quantities of the material to each of the outputs;

"Unbalanced Hot Runner" is a temperature controlled heated material conveying system, for the passage of material from an input (e.g. material supply source) to a plurality of outputs (e.g. metering valves for metering the material for supply of metered quantities of the material to injection mold cavities), which is not branched to provide passages of identical cross-section and length and does not divide the supplied material into equal quantities for the simultaneous supply of these quantities each to one of outputs.

BACKGROUND OF THE INVENTION

The manufacture of pure, or virgin, resin preforms for blow molding containers is well known within the prior art. But since the advent of recycling, it is now possible to manufacture preforms with materials that are compositionally less pure than virgin materials. Such degraded, or recycled, materials not only yield positive environmental benefits in an ecologically fragile era but provide manufacturers with an alternative manufacturing method which allows for substantial reductions in costs.

But, since recycled materials are obtained from post consumer solid waste, certain new manufacturing problems have been encountered that were heretofore previously unknown. For example, manufacturers must now provide, at increased costs, additional equipment for keeping the virgin and recycled materials separate from each other. In addition, multi-layered articles, such as preforms, that are eventually used to form containers for food stuffs, have even further impediments by way of rigid statutory guidelines. The guidelines, enacted by the Food and Drug Administration (FDA), require that certain minimums must be met, or exceeded, before the containers can be approved as "qualified" to contain food stuffs and before the foods are allowed to be distributed to the consumer population. One extremely noteworthy FDA provision enacted theretowards provides for the assurance of product "cleanliness".

Currently, in order to meet the FDA cleanliness standards, a container must be configured such that only surfaces of virgin materials contact the foods and beverages therein. Other container surfaces, such as areas for contacting the human mouth, e.g. the dispensing orifice on a soda container, also require virgin material surfaces. As a result, it is economically desirable to provide manufacturers with a apparatus capable of utilizing recycled materials within containers while, at the same time, preventing recycled materials from contacting the very foods and liquids that are to be distributed to, and consumed by, the public.

Some advances towards the aforementioned goal have been attained by using coinjection molding techniques to manufacture multi-layered containers. The multi-layered containers thence produced have interior and exterior surfaces of the container comprised of virgin materials while the fill and support materials located within the interior of the container walls comprise the degraded, less than pure, recycled materials. Consequently, the economies and conservation of utilizing recycled materials is thereby achieved while simultaneously meeting the strict FDA statutory requirements.

Prior art coinjection molding techniques that produce the multi-layered containers described above, often first manufacture a multi-layered preform and then blow mold the preform into the final container. The formation of multi-layered containers are described in detail, for example, in Applicant's U.S. Pat. Nos. 4,550,043 and 5,221,507.

Typically, the preforms are injection molded in multi-cavity molds which may have as many as 96 cavities. These preforms are then simultaneously produced by injecting appropriate amounts of a first and second material, i.e. virgin and recycled, into each of the cavities. To this end, the mold defines a manifold arrangement to convey the two materials to each of the singular cavities. Such an arrangement, as in Applicant's prior patents, is known to convey each of the first and second materials into a singular hot runner before contiguously conveying the materials to the cavities. The combination then allows for a reduction in equipment costs due to the singular hot runner arrangement. The singular conduit repeatedly divides the materials flowing therein into a plurality of flow paths for delivery to each cavity and to thereby ultimately provide each cavity with a substantially equal amount of metered material at substantially the same temperature and at substantially the same time as every other cavity. Yet, with mold arrangements containing large numbers of cavities, such as with forty-eight and ninety-six cavities, the two materials contiguously flowing within a singular conduit have been known to have interface boundary problems between the virgin and recycled materials when conveyed over lengthy distances.

Other prior art multi-cavity mold apparatus, that use coinjection molding to form multi-layered preforms, utilize molds in which a completely separate manifold system for each material, i.e. virgin and recycled, is used to separately convey that specific material to the singular cavities. The separate materials are then, either, injected simultaneously into the cavities using concentric nozzles or injected sequentially into the cavities utilizing a valve arrangement closely adjacent each cavity to control the flow from the separate manifolds into the multi-orifice nozzles. Such arrangements result in molds that are expensive and complex. In addition, such molds result in difficulties in controlling the temperature of the material to be injected into the cavity in a manner such that each mold receives an accurately metered quantity of material at substantially the same temperature.

Prior art injection molding systems for molding preforms simultaneously, with molding material supplied by way of a balanced hot runner, in a plurality of like cavities have utilized cavities in multiples of two in order to simplify the simultaneous supply of the materials, in equal amounts, to the cavities.

OBJECTS AND SUMMARY OF THE INVENTION

Accordingly, it is an object of the present invention to provide a method and apparatus that yields a delivery method for a first and second material that delivers the respective materials at substantially the same temperature and at reduced costs while conveying substantially equal amounts of the respective materials at substantially simultaneous delivery times.

It is a further object of the present invention to provide a more distinct division between the recycled and pure materials being contiguously conveyed within the same conduit to the individual mold cavities in order to more accurately provide a substantially equivalent amount of molding materials to each cavity.

It is a further object of the present invention to provide a method and apparatus using a multi-cavity coinjection mold which avoids the complex construction and expense of prior art multi-cavity coinjection molds and which provides a low cost, relatively simple, easy to regulate mold which is suitable for use on existing machinery at minimal conversion costs.

It is a further object of the invention to facilitate the use of injection molding systems for molding preforms simultaneously in pluralities of cavities of any number, odd as well as even (e.g. 4, 5, 10, 11, etc.).

These and other objects are achieved by providing an apparatus and method that utilizes a first hot runner manifold system which keeps at least one of a plurality of molding materials, virgin and recycled, for example, physically separated until they have been conveyed to locations adjacent individual cavities. Once conveyed to these locations, the molding materials are combined by a timed valve distribution mechanism, one per cavity, to produce a contiguous sequence of molding material comprised of metered quantities of the different materials. The contiguous quantities of material may then be conveyed through a second hot runner manifold system for injection simultaneously and sequentially into the individual cavities in desired amounts of the materials to produce a plurality of similar multi-layered preforms.

According to the invention there is provided a multi-cavity coinjection mold for simultaneously producing a plurality of multi-layered articles comprising: a mold structure defining a plurality of mold cavities; a first supply source for supplying a first molding material; a second supply source for supplying a second molding material; a hot runner system in communication with said first and second supply sources for conveying said first and said second materials separately to a region proximate each cavity; a valve mechanism per cavity for receiving said first and said second materials from said first hot runner system and for sequentially supplying desired quantities of said first and said second materials contiguously to a hot runner for each cavity, wherein each hot runner communicates with a single cavity only; and a temperature control means for maintaining the desired respective temperatures of said hot runner system, hot runners and said cavities.

Also according to the invention there is provided a multi-cavity coinjection mold for simultaneously producing a plurality of multi-layered articles comprising: a mold structure defining a plurality of mold cavities; a first supply source for supplying a first molding material; a second supply source for supplying a second molding material; a hot runner system in communication with said first and second supply sources for conveying said first and said second materials separately to a region proximate each cavity, the hot runner system comprising at least one unbalanced hot runner; a valve mechanism per cavity, each valve mechanism being arranged to receive said first and said second materials from said hot runner system and for sequentially supplying desired quantities of said first and said second materials contiguously to its associated cavity; and a temperature control means for maintaining the desired respective temperatures of said hot runner system and said cavities.

Also according to the invention there is provided a method of multi-cavity coinjection molding for simultaneously producing a plurality of multi-layered articles comprising the steps of: providing a mold structure defining a plurality of mold cavities; providing a first supply source for supplying a first molding material; providing a second supply source for supplying a second molding material; separately conveying said first and second material through a hot runner system from said first and second supply sources to a valve mechanism individual to and proximate each cavity; operating the valve mechanisms to sequentially supply desired quantities of said first and said second materials contiguously to a hot runner individual to each cavity; and controlling the temperatures of said hot runner system, hot runners and said cavities.

Also according to the invention there is provided a method of multi-cavity molding simultaneously producing a plurality of multi-layered articles comprising the steps of: providing a mold structure defining a plurality of mold cavities; providing a first supply source for supplying a first molding material; providing a second supply source for supplying a second molding material; separately conveying said first and second materials through an hot runner system, comprising at least one unbalanced hot runner from said first and second supply sources to a valve mechanism individual to and proximate each cavity; operating the valve mechanisms to sequentially supply desired quantities of said first and said second materials contiguously to each cavity; and controlling the temperatures of said hot runner system and said cavities.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
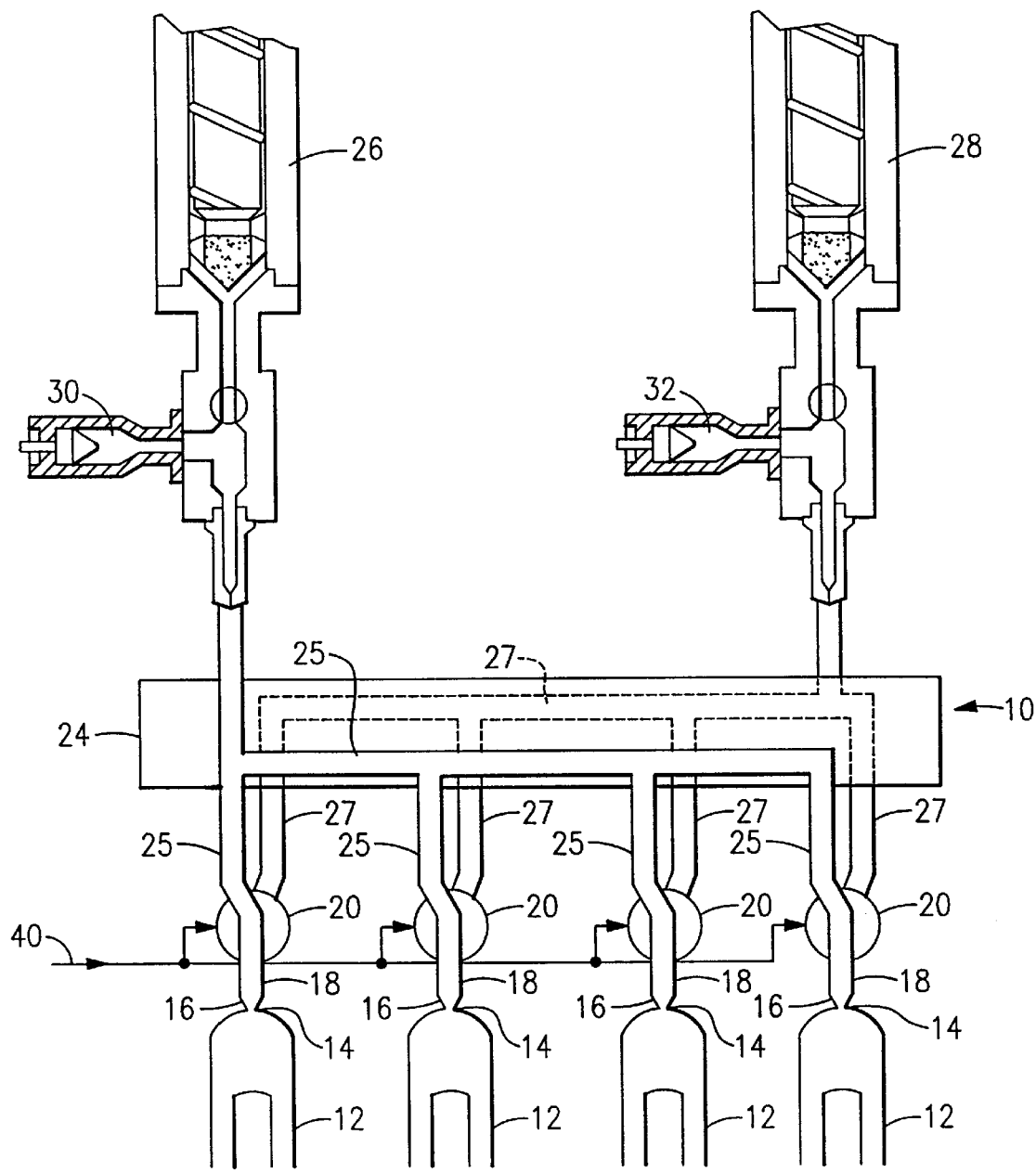
FIG. 1 is a diagrammatic cross-section of a multi-cavity sequential coinjection mold system according to one embodiment of the invention.

With reference to the embodiment of FIG. 1, a cavity mold 10 for the sequential coinjection molding of multi-layered preforms for the blow molding of multi-layered containers comprising interior and exterior surfaces of a virgin material (e.g. polyethylene terephthalate, PET) is illustrated as having four cavities 12. It will be appreciated by those skilled in the art that, in practice, the multi-cavity mold 10 depicted may have a greater number of cavities including both odd (e.g. 71) or even (e.g. 96) numbers. Four cavities 12 are used in this example to simplify explanation of the present invention which is applicable to molds having any number of cavities. Each cavity 12 is itself well known to those skilled in the art and is not described in detail herein. At the base of each cavity is a gate 14 through which passes the materials which will form the preform in that particular cavity. Connected to each gate 14 is a nozzle 16 having a cross section area of decreasing magnitude the nearer the cross section of nozzle 16 is to gate 14. The particular cross section is a function of the properties of materials conveyed and of how much material is to be injected. All of which are well known within the art.

The mold 10 defines a plurality of hot runners 18 each for conveying sequential quantities of alternating first and second molding materials contiguously from a timed valve mechanism 20, one for each cavity.

In operation, each timed valve mechanism 20, which provides the materials to the hot runners 18, receives first and second materials through a manifold system 24 which comprises unbalanced hot runners 25 and 27. The first and second materials are supplied by plasticizers 26 and 28 under control of ram pots 30 and 32, respectively. Each timed valve mechanism 20 switches between two discrete positions corresponding to runners 25 and 27 so that the two materials are sequentially supplied contiguously to the hot runner 18 of the associated cavity. Each valve mechanism 20 may also switch back and forth between a third discrete position wherein no material is allowed to flow by valve mechanism 20 to its hot runner 18. Also, if more than two materials are utilized each valve mechanism would have operating positions corresponding to the number of materials used.

The valve mechanisms 20 are closely adjacent their respective cavities 12. It will be appreciated that separate conveyance of the first and second materials to the valve mechanisms proximate their respective cavities will minimize any interface boundary difficulties between the first and second materials since the two materials are not contiguous within a singular conduit prior to reaching the valve mechanisms. Once combined by the valve mechanisms 20, the distance traveled by the contiguous first and second materials within the hot runners 18 is minimal and the difficulties of lengthy contiguous travel are minimized. Simultaneously, equipment cost advantages are realized since each hot runner 18 is a single undivided channel dedicated to a single cavity. In addition, hot runner manifold system 24 need not be a balanced conveyance system.

Timing control mechanism 40 facilitates the coordination of simultaneous switching of the plurality of valve mechanisms 20 so that substantially equal amounts of the materials will be supplied simultaneously to each individual cavity 12. Timing mechanism 40 may be any one of a variety of electromechanical mechanisms as will be well known to those skilled in the art and will not be described here in detail.

Further construction details of mold 10, particularly its hot runners, together with the heating and cooling arrangements therefore are also conventional within this technology and will be readily apparent to those skilled in the art. Likewise, the plasticizers and ram pots are of conventional construction as are the general engineering details of valve mechanisms. Accordingly, these matters are again not described herein in detail.

It will be further appreciated by those skilled in the art that the separate and distinct hot runners 25, 27 may be used to convey different materials from respective plasticizers 26 and 28 wherein the materials supplied from the plasticizers are of substantially different processing temperatures. Such an alternative arrangement, while providing distinct hot runners for materials of differing temperatures, may also be used if the materials are of the same processing temperature. The temperature control means used for each hot runner system 24 would then be adjusted to the same temperatures. In either event, the conveyance of the specific materials are again kept separate until conveyed to the appropriate proximate cavity regions. Conveyed first and second materials are then likewise supplied to a timed valve distribution system 20 for combining the materials into hot runners 18, nozzles 16 and eventually to the appropriate individual cavity 12.

Figure 2:
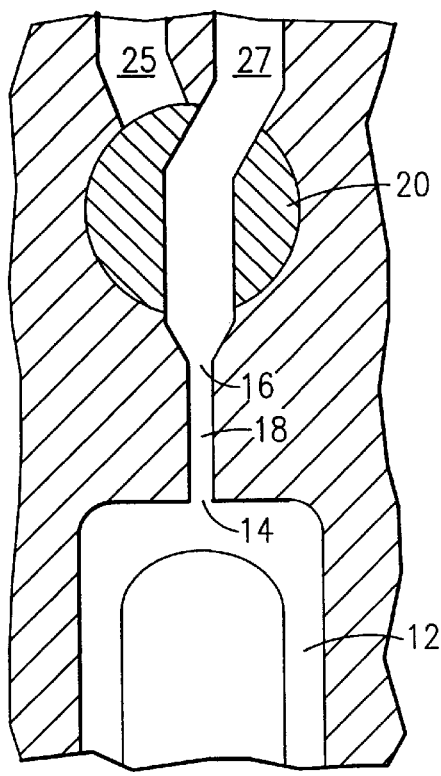
FIG. 2 is a diagrammatic representation of a valve to cavity variation from that shown in FIG. 1.

In FIG. 2, the nozzle 16 is closely adjacent the valve mechanism 20 with the passage between the nozzle 16 and the gate 14 leading to the cavity 12 being part of the hot runner 18.

Figure 3:
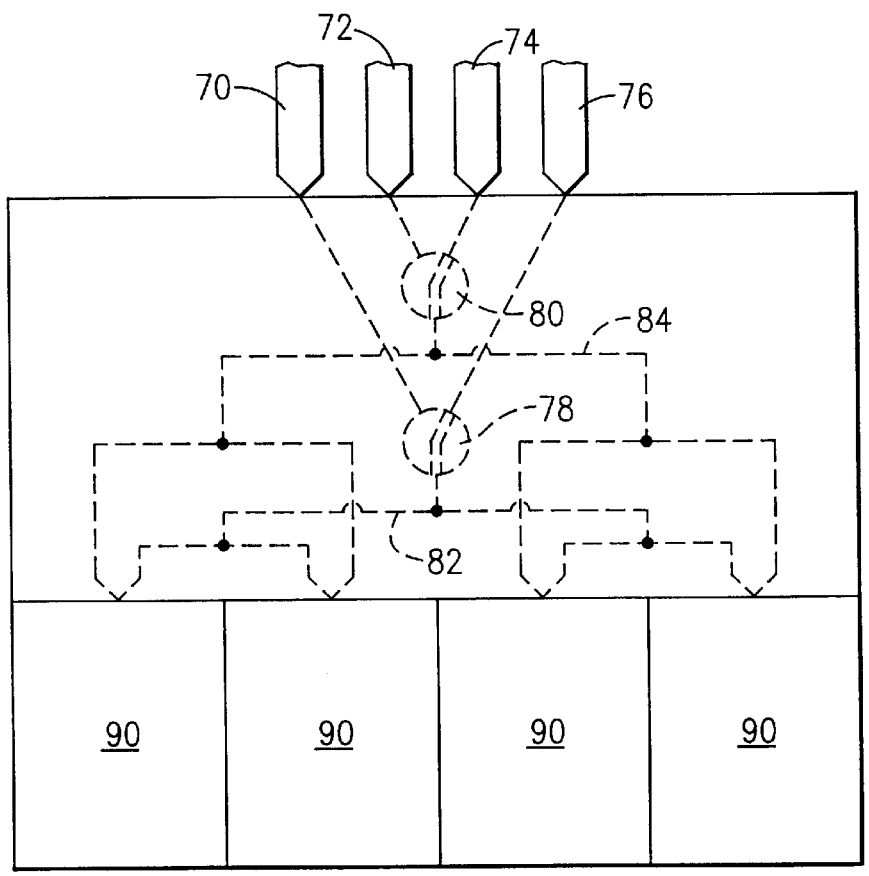
FIG. 3 is a diagrammatic illustration of another embodiment of the invention.

FIG. 3 illustrates another embodiment in which reference number 90 indicates, in diagrammatic form, an assembly comprising a cavity, gate, nozzle, hot runner and valve mechanisms similar to those numbered 12, 14, 16, 18 and 20 in FIG. 1.

In this embodiment, four plasticizers 70, 72, 74 and 76, which may have associated ram pots (not shown in FIG. 5), separately supply a plurality of up to four different materials to diverter valves 78 and 80 for metering and supply to balanced hot runners 82 and 84 for the contiguous supply of materials from plasticizers 70, 76 and 72, 74, respectively, to the valve mechanism of the assemblies 90, for metering thereby to provide the contiguous supply thereof through the hot runners of the assemblies 90 to the cavities thereof in a manner substantially as previously described herein with respect to the embodiment of FIG. 1. As mentioned materials from different plasticizers could be the same.

Although the embodiment of FIG. 3 illustrates the use of four plasticizers 70, 72, 74 and 76 and two balanced hot runners 82, 84 associated respectively with diverter valves 78, 80, it will be appreciated that two or more plasticizers could be arranged to supply two or more different plastics materials to a combination of unbalanced and balanced hot runners with each balanced hot runner being supplied with plastics materials by way of a diverter valve (e.g. 78, 80).

In an embodiment employing an unbalanced hot runner and a balanced hot runner the plasticizers may provide three different materials, for example, virgin PET recycled PET and another material, such as a barrier material. Alternatively, two of the plasticizers could supply virgin PET. In either circumstance virgin PET is supplied separately by way of the unbalanced hot runner to the valve mechanisms of the assemblies 90 while the other materials are metered by a diverter valve to the balanced hot runner for contiguous flow therethrough to supply the materials simultaneously and sequentially in equal quantities to the valve mechanisms of the assemblies 90 for metering, with the virgin PET from the unbalanced hot runner, to provide the contiguous supply of the materials from the valve mechanisms of the assemblies 90. Operation of all of the valves is preferably synchronized to ensure appropriate material metering.

In the event of the material from two of the materials both being virgin PET, this arrangement can advantageously be used to supply virgin PET through an unbalanced hot runner to valve mechanisms of the assemblies 90 without any possible contamination by the recycled PET, thereby to facilitate the formation of the inner surface of a multi-later article molded in the cavities and to supply virgin and recycled PET through a balanced hot runner for use in the article where contamination of the virgin PET is less critical.

It will be appreciated that, for example, a single plasticizer could be used to supply the same material to both the unbalanced hot runner and the diverter valve of the balanced hot runner and that similar variations are possible in other embodiments. In addition the balanced hot runners 82, 84 may be identical, in order to balance the contiguous supply of metered material therethrough, or may be different from each other and/or controlled at different temperatures to provide desired characteristics of material flow to the cavities.

The valve mechanisms may be provided with an "off" or closed position as well as a position for the introduction of each material sequentially and contiguously into the manifold 33.

Of course it will be appreciated that diverter valve operation could be adjusted, if injection molding in different cavity groups is unbalanced thereby causing non-uniform layers and or parts from cavity group to cavity group, by sequentially operating the valves and/or changing valve timing to adjust material flow from one cavity group to another, for example, so that cavity groups that would receive the most material would have their diverter valve operation delayed to compensate and balance the flow of material to the groups.

One of the materials may be recycled PET or a barrier material e.g. ethylene vinyl alcohol (EVOH) disposed intermediate polyester layers of the article.

In arrangements utilizing an unbalanced hot runner system for supplying the diverter valves 20 as illustrated in FIG. 1, the possibility of providing the diverter valves 20 at or closely adjacent the gates 14 and of utilizing thermal diverter valves at the gates emerges.

What is claimed is:

1. A method of multi-cavity coinjection molding for simultaneously producing a plurality of multi-layered articles comprising the steps of:

providing a mold structure defining a plurality of mold cavities;

providing a first supply source for supplying a first molding material;

providing a second supply source for supplying a second molding material;

separately conveying said first and second material through a hot runner system from said first and second supply sources to a valve mechanism individual to and proximate each cavity;

operating the valve mechanisms to sequentially supply desired quantities of said first and said second materials contiguously to a hot runner individual to each cavity;

injecting the first and second molding materials into the cavities, and controlling the temperatures of said hot runner system, hot runners and said cavities.

2. A method of multi-cavity coinjection molding for simultaneously producing a plurality of multi-layered articles comprising the steps of:

providing a mold structure defining a plurality of mold cavities;

providing a first supply source for supplying a first molding material;

providing a second supply source for supplying a second molding material;

separately conveying said first and second materials through a hot runner system, comprising at least one unbalanced hot runner from said first and second supply sources to a valve mechanism individual to and proximate each cavity;

operating the valve mechanisms to sequentially supply desired quantities of said first and said second materials contiguously to each cavity;

injecting the first and second molding materials into the cavities, and controlling the temperatures of said hot runner system and said cavities.

* * * * *